United States Patent Office 3,035,712
Patented May 22, 1962

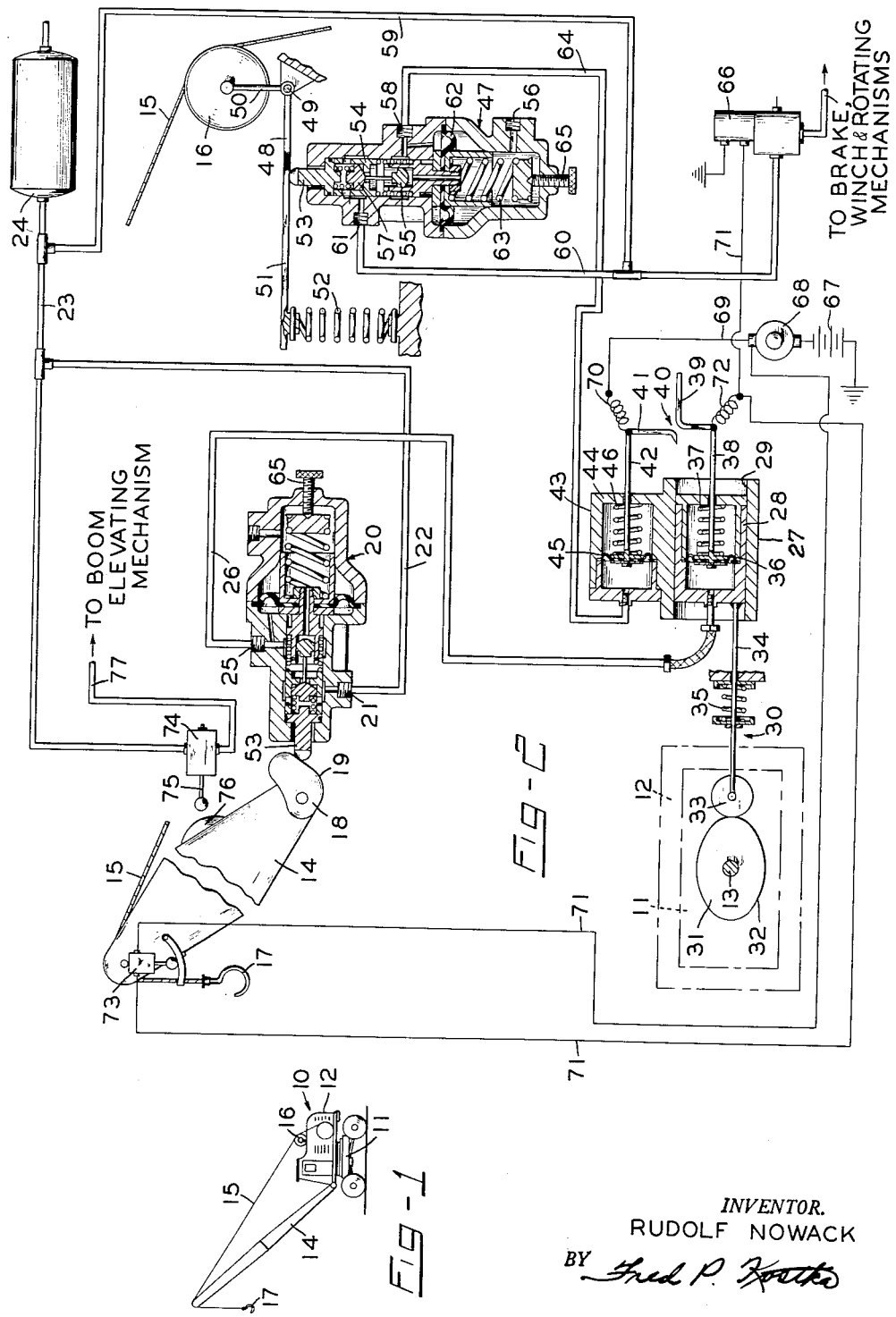

3,035,712
OVERLOAD SAFETY CONTROL APPARATUS FOR CRANES
Rudolf Nowack, Hannover, Germany, assignor to Westinghouse - Bremsen - Gesellschaft m.b.H., Hannover, Germany
Filed Feb. 9, 1961, Ser. No. 88,166
Claims priority, application Germany Feb. 17, 1960
11 Claims. (Cl. 212—39)

This invention relates to overload safety control arrangements for mobile hoisting equipment and, more particularly, to an overload safety control arrangement employed in mobile hoisting equipment, such as, mobile cranes, diggers and the like, which are characterized by a boom which is angularly movable in a vertical plane and which is carried on a cab-type superstructure rotatable about a vertical axis of a wheel or tread mounted undercarriage.

Generally, hoisting equipment of the above type is provided with an automatic safety control overload arrangement which is operative to stop operation of the hoisting equipment when the moment of force exerted by the load being hoisted approaches a value greater than the moment of resistance exerted by the undercarriage and superstructure thereby to prevent the hoisting equipment from tilting or pitching over on its side. The value of the moment of force which causes the hoisting equipment to pitch is commonly referred to as the pitching moment. The pitching moment of the crane is dependent on (1) the length of the moment arm as determined by the angular position of the boom, (2) the moment of force exerted by the load being lifted relative to the different angular positions through which the boom may be moved during hoisting, and (3) the angle of rotation of the superstructure supporting the boom relative to the undercarriage. Whenever one or a combination of the above factors causes a loading condition exceeding the pitching moment of the hoisting equipment, the control means is operative to automatically release the hoisting equipment so as to prevent the pitching thereof.

It is an object of the present invention to provide a new and novel automatic safety overload device of the above-described general type which is substantially trouble-free so as to assure safe operation thereof.

This is accomplished generally by the provision of a control arrangement comprising a mechanical arrangement for sensing the vertical angular position of the boom and the load being hoisted, a source of fluid under pressure, pressure regulating means for providing a magnitude of fluid under pressure corresponding to the angular position of the boom and to the load being hoisted, and electrical means including switch means responsive to said regulated magnitude of fluid under pressure corresponding substantially to the pitching moment of said hoisting equipment to cut off further operation thereof.

The arrangement further includes fluid pressure responsive abutment means mounted in cylinders and subject opposingly on one side to the regulated magnitude of fluid pressure corresponding to the mechanical loading on the boom. Associated with the abutment means for movement therewith are rod means connected to a switching means of the electrical means so that when the pressure responsive abutment means is subject to a force of pneumatic pressure corresponding to or exceeding the pitching moment of the equipment, the switch means are positioned to energize the electrical means thereby to disconnect the drive to the hoisting equipment. At values less than the pitching moment, the switch means are arranged to permit normal operation of the hoisting equipment.

Advantageously, there is employed in the electrical means an electro-magnetic responsive discharge valve which is operative upon energization of the electrical means to supply fluid under pressure to the means for activating the stop means associated with the rotation of the superstructure relative to the undercarriage and the means for uncoupling and braking the hoisting equipment.

As a further feature of the invention, there is provided a means for braking or disconnecting the hoisting equipment when the relative angle of rotation of the superstructure and the undercarriage of the crane is such that the moment of force exceeds or equals the pitching moment of the crane. To this end there is provided a cam-follower arrangement of which the cam is connected for rotation with the superstructure supporting the boom. The cam is formed so as to correspond to the angle of rotation of the superstructure relative to the undercarriage and the follower is operatively connected with the pneumatic means to coordinate this angular position with the moment of force or mechanical loading applied by way of the boom through the pressure responsive means.

A still further feature of the invention is the provision of limit switch means for energizing the electro-magnetic discharge valve in the electric circuit when the hoisting cable or the boom reaches its respective upper limits of travel.

Additional objects and features will hereinafter appear.

In the drawings:

FIG. 1 is an elevational view showing a typical hoisting apparatus in the form of a mobile crane in which the safety overload arrangement of the present invention may be employed.

FIG. 2 is a schematic view of the safety overload control arrangement embodying the present invention.

Referring now to the figures, the invention is shown embodied in a mobile crane 10 comprising essentially a wheel mounted undercarriage 11, a cab superstructure 12 rotatable about an axle 13 fixed on the undercarriage 11, a boom 14 pivotally supported at one end on the cab superstructure for movement in a vertical plane into different angular positions, a hoisting cable 15 trained over a sheave 16 having one end connected to a winch head (not shown) for winding the cable and a hook 17.

Connected to the lower end of the boom 14 is a cam disc 18 having a cam surface 19 formed to correspond to moment arms of the boom 14 in the different vertical angular positions thereof. The cam surface 19 is in constant engagement with a fluid pressure regulating valve 20. The regulating valve 20, of which the structure will be more fully set forth hereinafter, is of more or less conventional structure and is connected at its inlet port 21 via lines 22 and 23 with a reservoir 24 and at its outlet port 25 via line 26 to a pressure responsive device 27. In the preferred form of the invention a pneumatic pressure is employed, however, it is to be understood the system is also capable of being adapted for use with hydraulic pressure.

The pressure responsive device 27 includes a cylindrical casing 28 which is slidably supported for axial movement in a bore 29.

For selectively positioning the casing 28 of the pressure responsive device 27 within the bore 29, there is provided a cam-follower arrangement 30 comprising a cam 31 fixed for turning movement with the axle 13 carrying the cab superstructure 12 for rotation about the undercarriage 11. The cam 31 is formed with a camming surface 32 corresponding to the permissible pitching moment at the different angles of rotation of the boom carried on the cab superstructure relative to the undercarriage. It is to be observed that the maximum pitching moment relative to the angle of rotation of the boom to the undercarriage gradually decreases from a high limit value when the longitudinal axes of the undercarriage 11 and cab 12 are aligned as the angle of rotation increases and to a minimum limit value when the axes are transverse to each other. A follower 33 on one end of a rod 34 is constantly urged into engagement with the camming surface 32 via the spring arrangement 35. The other end of the rod 34 is fixedly connected to the cylinder casing 28 so as to displace the pressure responsive device 27 an amount corresponding to the angular relationship of the boom 14 to the undercarriage as determined by the position of the cam 31.

Disposed within the cylinder casing 28 of the pressure responsive device 27 is a movable abutment means which in the form shown is a diaphragm 36 subject opposingly on one side to the fluid under pressure entering the cylinder casing 28 via line 26 and on the other side to the force exerted by a spring 37. Connected to the diaphragm 36 is one end of a rod 38 of which the other end is connected to a contact arm 39 of a switch 40.

The other contact arm 41 of the switch 40 is carried on the free end of a rod 42 of a second pressure responsive device 43 constructed identically to the pressure responsive device 27. The pressure responsive device 43 comprises a cylindrical housing 44 fixedly secured against movement to a convenient supporting structure (not shown) and includes a diaphragm 45 connected to the interior end of the rod 42. The diaphragm 45 is subject opposingly to the force of a spring 46 on one side and on the other side to the force of fluid under pressure introduced into the cylinder 44 from a pressure regulating valve 47.

For regulating the force of the fluid under pressure supplied to the pressure responsive device 43 via the regulating valve 47, there is provided a load sensing means comprising a bell crank 48 pivotable about a fixed pivot stud 49. The terminal end of the upright leg 50 of the bell crank 48 supports the sheave 16 over which the hoisting cable 15 is trained and the terminal end of the horizontal leg 51 is supported by a spring 52 fastened thereto. The spring 52 is selected so as to yield proportional to the load applied to the cable. Upon yielding the bell crank 48 rocks counterclockwise about the pivot 49 so as to depress the stem 53 of the regulating valve 47.

The regulating valve 47 is identical to the structure of the pressure regulating valve 20 associated with the arrangement for measuring the angle of the boom 15. Accordingly, only the structure of the regulating valve 47 is hereinafter described and like numerals are used to identify like parts.

The regulating valve 47 comprises the stem 53 which is urged into contact with the arm 51 of the bell crank 48 so that upon clockwise rocking movement of the latter the stem is displaced downwardly. Downward movement of the stem 53 causes the valve sleeve 54 to also move downwardly whereby the exhaust valve 55 is seated to close the exhaust of the fluid under pressure through the exhaust port 56 and the supply valve 57 is unseated to supply fluid under pressure to the supply outlet 58 via lines 23, 59, 60 and inlet port 61. At the same time fluid under pressure is supplied on the diaphragm 62 opposingly to the spring 63. When the forces exerted by the fluid under pressure and spring 63 are in equilibrium, the supply valve 57 seats so that the regulating valve is now in lap position and further supply of fluid under pressure to the supply port 58 and venting of fluid under pressure to the exhaust port 56 is cut off. In this manner the magnitude of the fluid under pressure at the supply port corresponds to the loading being lifted by the hoisting cable 15. This magnitude of fluid under pressure is introduced into the cylinder 44 of the pressure responsive device 43 via line 64.

The regulating valve 20 functions similarly to the regulating valve 47 and is responsive to the position of boom angle sensing cam 18 which constantly contacts the stem 53 so that the magnitude of the fluid under pressure at the supply port 25 corresponds to the moment arm of the boom 14. This magnitude of pressure is introduced into the axially movable pressure responsive device 27.

The lower limit of the range of the regulated magnitudes of fluid under pressure corresponding to positions of boom or the load being hoisted is determined by way of the adjustment screw 65 in the well-known manner provided on each of the valves 20 and 47.

The line 59 is connected into the main fluid pressure line 23 and associated with the line 59 is an electromagnetic discharge valve 66 which is energized by way of the electrical circuitry. Opening of the electro-magnetic responsive discharge valve 66 serves to supply fluid to the brake and cut-off winch actuating mechanism (not shown) for stopping operating of the hoisting and rotating mechanisms.

The electrical circuit comprises essentially a battery 67 of which one pole is connected to ground and the other pole is connected by means of a push button 68 with the contact arm 40 by way of lines 69 and 70. Also connected to the push button is a second line 71 to which is connected via line 72 the contact arm 39 and one terminal of the electro-magnetic discharge valve 66. The remaining terminal of the electro-magnetic discharge valve 66 is conveniently connected to ground.

*Operation*

Assuming that the reservoir 24, as well as the lines 22, 23, 59 and 60 are suitably charged with fluid under pressure, for example, to four or five atmospheres, i.e., about 55 to 70 p.s.i., if during the operation the boom 14 is positioned at a predetermined angle relative to the horizontal, the cam 18 is correspondingly displaced so that the camming surface 19 is operative to position the stem 53 of the regulating valve 20 whereby a magnitude of fluid under pressure corresponding to the position of the boom, i.e., moment arm, is supplied to the pressure responsive device 27 connected thereto via line 26. This causes the diaphragm 36 within the cylinder to move to the right whereby the contact arm 39 connected to the end of the rod 38 assumes a position corresponding to the length of the moment arm of the boom.

The weight of the load being hoisted is determined via the hoisting cable 15 by way of the sheave 16 supported on the end of the bell crank 48. When the load on the hoisting cable 14 is such as to cause the spring 52 to yield, the bell crank 48 rocks about its pivot 49 to depress the stem 53 of the regulating valve 47. As heretofore explained, the depression of the stem 53 results in the release of the fluid under pressure from the supply outlet 58 at a magnitude corresponding to the load being lifted. This pressure is introduced into the line 64 so as to cause a displacement of the contact arm 41 via rod 42 and diaphragm 45 of the pressure responsive device 43. In this manner the contact arm 42 assumes a position corresponding to the load on the hoisting cable 15. Hence, whenever the load on the cable 15 or moment arm of boom 14 is such that the pitching moment is approached, both the contacts 39 and 41 are positioned to close the electrical circuit. When the contacts 39 and 41 close, the discharge valve 66 is energized thereby to supply pressure from the reservoir 24 via the line 59 whereby the braking mechanism and winch driving mechanism, as well as the cab rotating means are controlled so as to cut off further operation thereof.

It is, of course, to be understood that the contacts 39 and 41 may be arranged so as to be closed in their initial normal operating conditions and to open when an overload or pitching moment condition exists.

As heretofore described, the pitching moment or load carrying capacity of the crane is also dependent upon a relative angle of rotation of the cab superstructure relative to the undercarriage carrying the same and decreases toward a minimum when the lengthwise axes are transverse to each other.

When the lengthwise axis of the crane is turned angularly relative to the lengthwise axis of the undercarriage, the camming surface 32 of the cam 34 is arranged so as to position the cylinder 28 of the pressure responsive device 28 whereby the switch contact arm 39 or cylinder is displaced a corresponding amount closer to contact arm 41. In this manner the contacts 39 and 41 close at a lower value of pitching moment at the same position of the boom and at the same load being hoisted so that the decreased load carrying capacity caused by the rotation of cab is accounted for.

In order to limit the travel of the hook attachment 17 upwardly toward the terminal end of the boom, there may be provided in the line 71 of the electric circuit a limit switch 73. In the highest position of the hook 17 the limit switch 73 is energized by means of a curved lever which may be attached conveniently to the boom 14 in the path of movement of the hook 17 so as to contact the limit switch 73 whereby the circuit to the electromagnetic discharge valve 67 is energized. Energization of valve 67 causes the fluid under pressure to be supplied to the stopping mechanism from the reservoir 24 via line 59, as explained heretofore.

In order to prevent the elevation of the boom to an extreme angle, there may be provided in the line 23 a discharge valve 74 having an arm 75 which is adapted to be depressed by a camming member 76 when the boom 14 is elevated at its maximum angle. When the arm 75 is depressed, fluid under pressure is supplied via line 77 to means (not shown) for braking the boom hoisting so that further elevation of the boom under the excessive pulling conditions is stopped.

Having now described the invention, what I claim as new and desire to secure by Letters Patent, is:

1. A safety overload control arrangement to prevent the pitching of hoisting equipment including a boom carried by a cab superstructure rotatable about an undercarriage and angularly movable in a vertical plane, and a hoisting cable trained over a sheave, said control arrangement comprising means for sensing the vertical angular position of said boom and the load being lifted by said hoisting cable, a source of fluid under pressure, fluid pressure means operatively associated with said sensing means for providing a magnitude of fluid under pressure corresponding to said angular position and said load, and electrical means including switch means responsive to said magnitude of fluid under pressure substantially corresponding to the pitching moment of said hoisting equipment to cut off further operation thereof.

2. A safety overload control arrangement to prevent the pitching of hoisting equipment and including a boom carried by a cab superstructure rotatable about an undercarriage and angularly movable in a vertical plane, and a hoisting cable trained over a sheave, comprising fluid pressure means for sensing the angular position of said boom and the load being lifted by said hoisting cable, a source of fluid under pressure, pressure regulating means for providing a regulated magnitude of fluid under pressure corresponding to the angular position of said boom and the load being lifted, pressure responsive means including means positionable in response to said regulated magnitude of fluid under pressure, and electrical means including switch means connected to said positionable means and operative when said regulated magnitude of pressure substantially corresponds to the pitching moment of said hoisting equipment to cut off further operation thereof.

3. A safety overload control arrangement to prevent the pitching of hoisting equipment including a boom carried by a cab superstructure rotatable about an undercarriage and angularly movable in a vertical plane, and a hoisting cable trained over a sheave, said control comprising means for sensing the angular position of said boom, means for sensing the load being lifted by said hoisting cable, a source of fluid under pressure, a first pressure regulating means operatively associated with said boom position sensing means for providing a magnitude of pressure corresponding to said moment arm of said boom, a second pressure regulating means operatively associated with said hoisting cable for providing a magnitude of fluid under pressure corresponding to the load being lifted, a first pressure responsive means including means positionable responsive to said regulated magnitude of fluid under pressure connected to said first pressure regulating means, and a second pressure responsive means including means positionable in response to said load regulating magnitude of fluid under pressure, and electrical means including a switch means having a pair of contact arms of which one is connected to one of said positionable pressure responsive means and the other is connected to the other of said positionable pressure responsive means so as to energize said electrical circuit and cut off further operation of said hoisting equipment when said magnitudes of regulated pressures of said boom and said load are such as to correspond substantially to the pitching moment of said equipment.

4. The control arrangement as defined in claim 3 in which said boom position sensing means comprises a cam fixed for movement with the boom and having a camming form to correspond to the different vertical angular positions of the boom.

5. The control arrangement as defined in claim 3 in which said load sensing means comprises a bell crank carrying said sheave on one arm thereof and having a spring connected to the other arm thereof whereby said bell crank rocks in response to forces proportional to the load being hoisted.

6. The invention as defined in claim 3 in which said source of fluid under pressure is adapted to be supplied to the means for cutting off operation of said hoisting equipment and said electrical means includes an electromagnetic discharge valve operative when said electrical means is energized to supply fluid under pressure to the cut-off means.

7. A safety overload control arrangement to prevent the pitching of hoisting equipment including a boom carried by a cab superstructure rotatable about an undercarriage and angularly movable in a vertical plane, and a hoisting cable trained over a sheave, said control means comprising means for sensing the angular position of said boom and the load being lifted by said hoisting cable, means for sensing the angle of rotation of said cab superstructure relative to said undercarriage, a source of fluid under pressure, fluid pressure means operatively associated with said sensing means for providing a magnitude of fluid under pressure corresponding to said angular position and said load, and electrical means including switch means responsive to a said magnitude of fluid under pressure and the angle of rotation of said cab superstructure corresponding substantially to the pitching moment of said hoisting equipment to cut off further operation thereof.

8. A safety overload control arrangement to prevent the pitching of hoisting equipment including a boom carried by a cab superstructure rotatable about an undercarriage and angularly movable in a vertical plane, and a hoisting cable trained over a sheave, said control means comprising means for sensing the angular position of said boom, means for sensing the load being lifted by said hoisting cable, means for sensing the angle of rotation of said cab superstructure relative to said undercarriage, a source of fluid under pressure, a first fluid pressure regulating means operatively associated with said sensing means for providing a magnitude of fluid under pressure corresponding to said angular position, a second fluid pressure regulating means for providing a magnitude of fluid under pressure corresponding, and a pair of fluid pressure responsive means including means positionable in response to said respective magnitudes of fluid pressures to said load, means mounting one of said fluid pressure responsive means for movement relative to the other of said fluid pressure responsive means so as to selectively position said positionable means associated with said movable mounted pressure responsive means relative to said positionable means associated with said other pressure responsive means, means connecting said movable pressure responsive means with said angle of rotation sensing means, and electrical means including switch means connected to a said positionable means and being operative when said angle of rotation corresponds substantially to the pitching moment of said hoisting equipment to cut off further operation thereof.

9. The invention as defined in claim 7 in which said electrical means includes limit switch operative when said cable is in its upper limit position to cut off operation of said hoisting equipment.

10. The invention as defined in claim 7 in which said fluid pressure system includes limit means operative at the upper limit of movement of said boom to cut off further hoisting of the load and elevating of the boom.

11. An overload safety control apparatus for mobile hoisting equipment as shown in the accompanying drawing and described in connection therewith in the accompanying specification.

References Cited in the file of this patent

UNITED STATES PATENTS

| | | |
|---|---|---|
| 1,614,575 | Siebs | Jan. 18, 1927 |
| 2,529,193 | Reuter | Nov. 7, 1950 |